United States Patent [19]

Adsit

[11] Patent Number: 4,550,849

[45] Date of Patent: Nov. 5, 1985

[54] REFUSE CONTAINER

[75] Inventor: Gordon H. Adsit, Lake Wales, Fla.

[73] Assignee: Industrial Refuse Sales, Inc., Lakeland, Fla.

[21] Appl. No.: 723,339

[22] Filed: Apr. 15, 1985

[51] Int. Cl.⁴ .................................................. B65D 43/14
[52] U.S. Cl. ..................................... 220/71; 220/1 T; 220/1.5
[58] Field of Search ................... 220/71, 72, 83, 65 H, 220/1.5, 1 T

[56] References Cited

U.S. PATENT DOCUMENTS

| | | | |
|---|---|---|---|
| 3,623,631 | 11/1971 | Ford | 220/71 X |
| 3,823,972 | 7/1974 | Ramer | 220/1.5 X |
| 4,136,465 | 1/1979 | Wilson | 220/1.5 X |
| 4,335,828 | 6/1982 | Robinson et al. | 220/1 T X |
| 4,416,374 | 11/1983 | Smith et al. | 220/1.5 X |
| 4,445,623 | 5/1984 | Kolling et al. | 220/1 T X |

Primary Examiner—Steven M. Pollard
Attorney, Agent, or Firm—Duckworth, Allen, Dyer & Pettis

[57] ABSTRACT

A thermoformable plastic commerical refuse container is rotationally molded with a pair of metal lifting sleeves in situ' molded into the container. The side walls of the container are designed to accept the metal sleeves internally of the container and to distribute the lifting stress over the wall. The container walls are outwardly projected above the sleeves so as to increase the available storage volume of the container. An improved box-shaped top flange design is used to tie the walls of the container together and to provide increased strength and rigidity.

18 Claims, 2 Drawing Figures

REFUSE CONTAINER

BACKGROUND OF THE INVENTION

1. Field of the Invention

The present invention relates to an improved trash or refuse container and, more particularly, is directed to relatively large commercial refuse containers of the type handled by mechanical refuse trucks.

Refuse bins or containers of the type with which the present invention is concerned are generally fabricated of steel and provided with hinged steel lids. Such containers are relatively expensive to fabricate and have the disadvantage that they are subject to deterioration due to rusting caused by their outside storage. They also have the disadvantage that they are heavy and for this reason are difficult to handle. Recently, attempts have been made to overcome the disadvantages of the prior art metal containers by manufacturing such containers of plastic. Such plastic containers have been formed in essentially the same shape as the prior metal containers. In order to provide a lifting mechanism for the refuse trucks, metal sleeves, channel, and skids, have been bolted or otherwise attached to the outside end surfaces of the plastic containers for receiving the forks of a typical refuse truck.

Because the forks of a refuse truck have become substantially standardized in spacing, the prior art plastic and steel bins have been about the same capacity and size because the sleeves through which the forks are inserted are on the outside of the container such that the container must fit between the forks. In addition, the mounting techniques for attaching the sleeves to the container have resulted in numerous occasions wherein the sleeves are pulled from the container destroying the ability of the refuse truck to lift and unload the container. Depending upon the degree of damage done when the sleeves are pulled from the containers, such damage may result in unnecessary replacement of the plastic refuse containers.

It is an object of the present invention to provide an improved refuse container.

It is a further object of the present invention to provide an improved refuse container constructed of a thermoformable plastic.

It is a still further object of the present invention to provide a refuse container of thermformable plastic with improved lifting stability and durability.

It is still a further object of the present invention to provide a refuse container of thermoformable plastic with improved lifting stability and durability.

It is still another object of the present invention to provide an improved refuse container formed of plastic which incorporates steel sleeves for lifting molded into the container and become an integrated part of it.

It is yet another object of the present invention to provide an improved refuse container of plastic which increases the available storage volume.

It is still another object of the present invention to provide an improved refuse container having increased rigidity through use of an improved top flange design.

SUMMARY OF THE INVENTION

The present invention is characterized in that it is rotationally-molded from a thermoformable plastic in a single operation to form a complete open top refuse container. Metal sleeves having a size and shape adapted to fit the fork-like arms from a refuse container truck are placed in the mold at the time that the container is formed. The mold contains fixturing elements which hold the sleeves in the correct position to allow the plastic to flow completely around their outside surface whereby the sleeves are actually molded into the plastic forming the outer wall of the container. The mold form contains stepped indentations in those areas forming the end walls of the containers. The sleeves fit into the stepped indentations in such a manner as to leave approximately one-quarter inch of a sleeve protruding from the container through the identation after the container is formed. Above the stepped indentations, the sides of the end walls continue vertically and are then flared out to meet with the portion of the container forming the front and rear walls. This arrangement provides additional space above the sleeve members and also provides for stress distribution to prevent distortion of the container when it is lifted.

The two end walls, the front wall and the rear wall are tied together at the top by an improved top flange which is molded in place with a box-shaped cross section so as to provide additional strength to permit the container to retain its shape under stress. The front wall of the container, i.e., that wall which would be adjacent a refuse container truck, is also provided with molded ribs to further strengthen the front wall which mates against the truck when the container is lifted.

The foregoing and other objects, features and advantages of the inventive will become more apparent by reference to the accompanying drawings and the following detailed description.

DESCRIPTION OF THE PREFERRED EMBODIMENT

Figure 1:
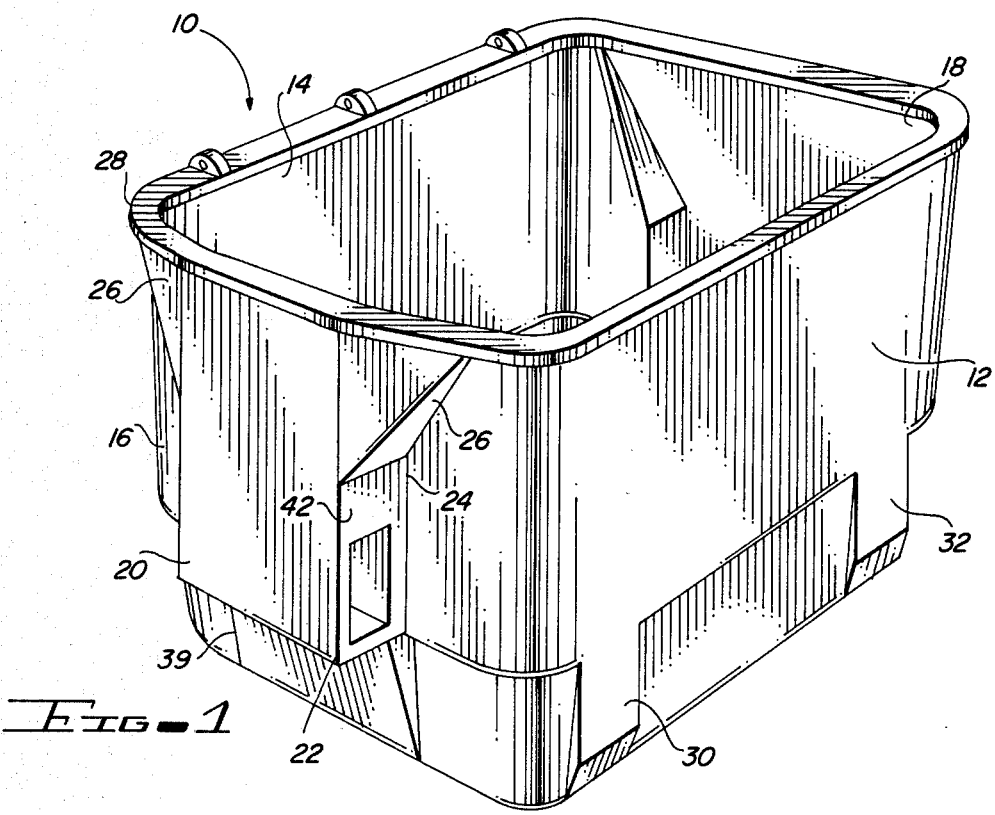
FIG. 1 is a perspective view of a refuse container constructed in accordance with the present invention.

Referring now to FIG. 1, there is illustrated a refuse container 10 in accordance with the present invention. Preferably, the container is constructed of a thermoformable plastic such as cross linked polyethylene of the type available from Phillips Petroleum Corporation under the designation CL-100. The container 10 is typically formed by rotational molding using a hollow mold (not shown) having the inside shaped in the form of the desired container. Typically, the molds are a clam shell type design and open up so that the formed container can be removed. Rotational molding is well known in the art but essentially involves placing the mold on a pedestal which turns in a gyro-type motion around two axes at the same time. The mold is loaded with the amount of powered plastic resin needed to form the container to the desired thickness. The mold is then moved into a heater, typically a hot air oven, where it rotates at approximately 500 degrees. The resin forms to the wall of the mold creating a plastic lining on the inside. After cooling, the mold is opened up and the container 10 removed as a plastic part.

The container 10 has a front wall 12, a rear wall 14 and first and second end walls 16 and 18. Each of the end walls 16 and 18 include an extension 20. The extension 20 forms a part of the end walls and also forms a section for receiving the forks from a refuse container truck (not shown). A metal sleeve 22 is set into the extension 20. The extension 20 further includes a portion 24 extending substantially perpendicular to the bottom plane of the container 10 and a second portion 26 extending from the perpendicular section towards a corresponding corner of the container 10 whereby the stress on the container caused by lifting at the metal sleeve 22 is evenly distributed across the container. Preferably, the rear wall 14 is slightly higher than the front wall 12 so that when a lid is placed on the container 10, water or other material will drain off the lid.

The top of the container includes an improved flange 28 which is molded as a box shaped cross section and serves to tie the four walls of the container together. The front wall of the container further includes first and second rib like protrusions 30 and 32 which are designed to absorb the impact on the container 10 when the container is lifted by a refuse container truck and allowed to slide onto the lifting forks and into contact with the front of the truck. Each of the end walls 16 and 18 also include a rib section 34 which imparts additional strength to the end wall and further allows distribution of the stress on the end walls of the container to thereby improve its capability to resist deformation.

Figure 2:
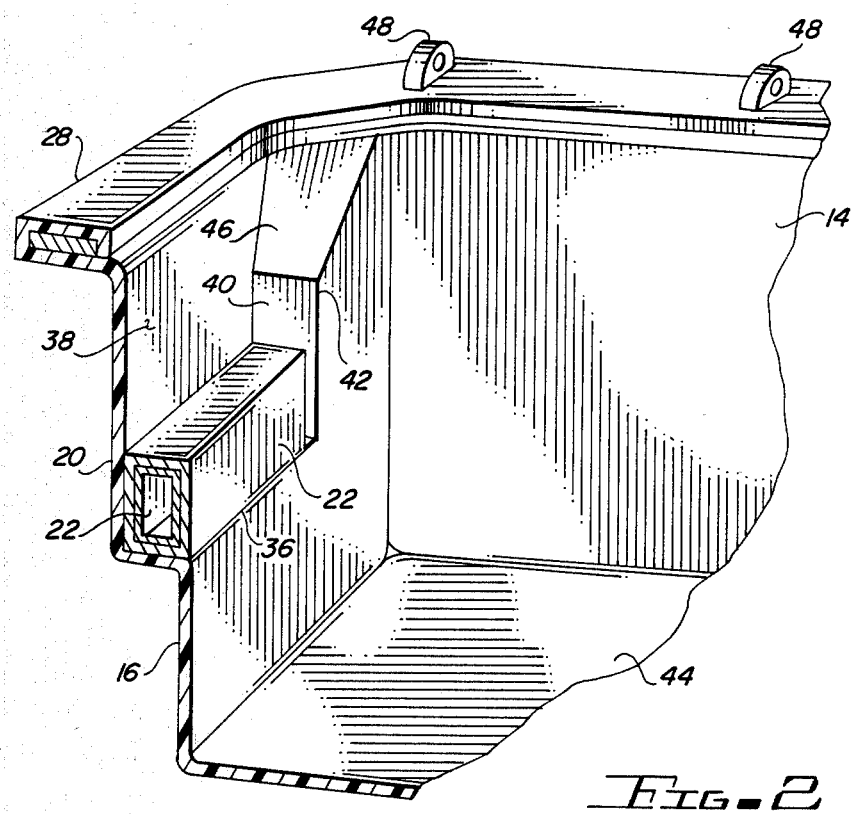
FIG. 2 is a cross sectional view of one end wall of the inventive container illustrating the attachment of the metal sleeve and the improved top flange.

Referring now to FIG. 2, there is shown a cross sectional view of an end wall 16 more specifically illustrating the top flange 28 and arrangement of the sleeve 22. As can be seen, the extension 20 comprises a stepped indentation having an internal lower surface 36, internal side surface 38 and an end portion 40. Each extension also has a second end portion which cannot be seen in FIG. 2 but which is shown as 42 in FIG. 1. Each of the sleeves 22 has a side face attached to the side surface 38 and a lower face attached to the lower surface 36. Preferably, sleeves 22 are placed in the aforementioned container mold prior to molding the container 10 and are positioned such that there is approximately ¾" space between each of the faces of the sleeve and the adjoining surface 36 and 38 into which the powdered resin is allowed to flow so that the sleeves 22 become an integral part of the molded container 10. The sleeves 22 are thus in situ' molded into the container 10 side walls. Alternatively, the sleeves 22 could be bonded to the inside surface of the container 10 after molding although such a bonding arrangement would not have the strength and rigidity of my preferred in situ' molding.

As can be seen in FIG. 2, the end portion 40 comprises a first section 44 extending substantially perpendicular to a plane passing through a bottom 46 of the container 10 and further includes a second section 48 extending from the section 44 to a point 50 adjacent the uppermost intersection of the end wall 16 and the rear wall 14. It should be noted that because the step indentation 20 extends outward from the inside of the container 10, the volume of the container above the surface 36 is greater than the volume below that surface, thus increasing the available storage volume.

FIG. 2 also illustrates the cross section of the top flange 28. It should be noted that the flange 28 has a double folded arrangement and is approximately twice as wide as its height. Preferably, hinge lugs 48 are also molded onto the top flange 28 during the forming process. Although only two lugs are shown in FIG. 2, it will be appreciated that for a split double lid of the type typically found on commercial refuse containers, four lugs 48 would be formed on flange 28.

In one embodiment of the present invention, the sleeves are formed from ten guage tubular steel 8" high by 4" wide and 24" long. The finished molded container has a ¼" wall thickness to provide both rigidity and strength. By molding the entire container as one unitized piece, the tendency of welded or cemented parts to separate is avoided. The present invention thus provides an improved refuse container having increased strength and rigidity while also increasing its volume. The container is also lighter in weight than similar sized metal containers. There is further disclosed a method of manufacturing such a container so as to incorporate the metal lifting sleeves in the final product.

While the principals of the invention have now been made clear in an illustrative embodiment, there will become obvious to those skilled in the art many modifications in structure, arrangement, portions, materials and components used in the practice of the invention and otherwise which are particularly adapted for specific environments and operating requirements without departing from those principals. The appended claims are therefore intended to cover and embrace any such modifications, within the limits only of the true spirit and scope of the invention.

I claim:

1. In a refuse container having a substantially rectangular shaped molded plastic body defined by first and second opposed end walls, a front wall, a rear wall and a bottom, the improvement comprising:
    an extension formed in each of said end walls, said extension forming a stepped indentation in each of said end walls protruding outwardly of said container;
    first and second metal sleeves, said sleeves being attached to a corresponding one of said end walls at said stepped indentation inside said container; and
    an opening formed in each of said extensions whereby said container may be lifted by arms inserted into said sleeves.

2. The container of claim 1 wherein said extension is narrower in width than said side wall and each of said sleeves include a portion protruding through its corresponding extension.

3. The container of claim 2 wherein said extension has an internal lower surface defining said stepped indentation, an internal side surface defining a portion of said end wall, and first and second end portions, each of said sleeves having a first face attached to said side surface and a second face attached to said lower surface.

4. The container of claim 3 wherein said end portions include first sections extending perpendicularly with respect to the plane of said container bottom and second sections extending from said first sections to corresponding points adjacent the uppermost intersections of said end walls with said front and rear walls whereby stress caused by lifting of said container using said sleeves is uniformly distributed.

5. The container of claim 4 wherein the cross-sectional area above said stepped indentation is greater than the cross-sectional area below said stepped indentation.

6. The container of claim 3 wherein each of said sleeves protrude through said first and second end portions of corresponding ones of said extensions.

7. The container of claim 3 wherein said sleeves are positioned with approximately ¾" inch spacing between each of said first and second face of said sleeve and the corresponding portion of said end wall to thereby permit plastic to surround said sleeve.

8. The container of claim 2 wherein said protruding portion is approximately ¼" in length.

9. The container of claim 1 or claim 4 wherein said rear wall is higher than said front wall.

10. The container of claim 1 wherein said molded plastic comprises cross-linked polyethylene.

11. The container of claim 1 wherein said sleeves are attached to said end walls by in situ molding during manufacture of said container.

12. The container of claim 11 wherein said sleeves are encased in plastic by said in situ molding.

13. The container of claim 1 and including a double folded top flange joining each of said end walls to said front and rear walls.

14. The container of claim 13 wherein said top flange comprises an in situ molded box-like cross sectional flange having a substantially flat top surface.

15. The container of claim 14 wherein said top flange includes at least two hinge lugs attached to said flat top surface.

16. The container of claim 1 and including first and second rib portions molded in situ to said front wall in a position to distribute stress on said front wall when said container is lifted.

17. A method for manufacturing a container adapted for lifting by first and second opposed lifting forks:
   providing first and second metal sleeves each having an internal dimension sufficient to accept one of the first and second lifting forks;
   forming a refuse container having an extension on each end thereof, each extension defining an internal pocket in the container sized to fit one of the sleeves; and
   attaching each of the sleeves to a corresponding one of the pockets internally of the container such that ends of the sleeves protrude from opposing sides of the extensions for accepting the lifting forks.

18. The method of claim 17 wherein said steps of forming a refuse container and attaching the sleeves includes the steps of:
   constructing a hollow mold having a shape corresponding to a desired shape of the container;
   positioning the sleeves within the mold in a desired final position;
   depositing a quantity of powdered plastic resin sufficient to form the container into the mold;
   rotating the molded in a manner to cause the resin to be distributed therein; and
   heating the mold to melt the resin whereby the sleeves are in situ bonded to the container.

* * * * *